(12) United States Patent
Chen et al.

(10) Patent No.: US 6,598,967 B1
(45) Date of Patent: Jul. 29, 2003

(54) MATERIALS FOR REDUCING INTER-COLOR GLOSS DIFFERENCE

(75) Inventors: Huijuan D. Chen, Webster, NY (US); Gang C. Han-Adebekun, Rochester, NY (US); James A. Reczek, Rochester, NY (US)

(73) Assignee: Eastman Kodak Company, Rochester, NY (US)

( * ) Notice: Subject to any disclaimer, the term of this patent is extended or adjusted under 35 U.S.C. 154(b) by 0 days.

(21) Appl. No.: 10/034,281

(22) Filed: Dec. 28, 2001

(51) Int. Cl.$^7$ .................................................. B41J 2/01
(52) U.S. Cl. ......................... 347/100; 347/95; 347/96; 347/101; 347/105
(58) Field of Search ..................... 347/100, 96, 101, 347/95, 105; 106/31.13, 31.6; 346/135.1

(56) References Cited

U.S. PATENT DOCUMENTS

| | | |
|---|---|---|
| 4,597,794 A | 7/1986 | Ohta et al. |
| 5,026,427 A | 6/1991 | Mitchell et al. |
| 5,085,698 A | 2/1992 | Ma et al. |
| 5,086,698 A | 2/1992 | Wirz |
| 5,141,556 A | 8/1992 | Matrick |
| 5,160,370 A | 11/1992 | Suga et al. |
| 5,169,436 A | 12/1992 | Matrick |
| 5,172,133 A | 12/1992 | Suga et al. |
| 5,738,716 A * | 4/1998 | Santilli et al. ............... 347/100 |
| 5,853,965 A | 12/1998 | Haydock et al. |
| 5,866,282 A | 2/1999 | Bourdelais et al. |
| 5,874,205 A | 2/1999 | Bourdelais et al. |
| 5,888,643 A | 3/1999 | Aylward et al. |
| 5,888,681 A | 3/1999 | Gula et al. |
| 5,888,683 A | 3/1999 | Gula et al. |
| 5,888,714 A | 3/1999 | Bourdelais et al. |
| 6,011,098 A * | 1/2000 | Kashiwazaki et al. ...... 524/377 |
| 6,096,463 A * | 8/2000 | Hamano et al. ............... 430/47 |
| 6,244,701 B1 * | 6/2001 | Moriya et al. ............... 347/105 |
| 6,268,101 B1 | 7/2001 | Yacobucci et al. |
| 6,436,515 B1 * | 8/2002 | Ohbayashi et al. ......... 428/195 |

FOREIGN PATENT DOCUMENTS

| | | |
|---|---|---|
| EP | 1 048 466 A2 | 11/2000 |
| EP | 1 057 646 A2 | 12/2000 |

OTHER PUBLICATIONS

Research Disclosure 308119, published Dec. 1989, pp. 1007 to 1008.
Chen, et al., Ink Jet Ink Set, USSN 10/034,721 filed Dec. 28, 2001.
Han–Adebekun et al., A Method of Selecting Ink Jet Inks in a Color Set, USSN 10/034,285 filed Dec. 28, 2001.
Reczek et al., Ink Jet Ink Set/Receiver Combination, USSN 10/033,229 filed Dec. 28, 2001.
Han–Adebekun, et al., A Method of Selecting Ink Jet Inks and Receiver in a Color Set and Receiver Combination, USSN 10/032,931 filed Dec. 28, 2001.
Wexler, Ink Jet Printing Method, USSN 09/954,779 filed Sep. 13, 2001.

* cited by examiner

*Primary Examiner*—Raquel Yvette Gordon
*Assistant Examiner*—Manish S. Shah
(74) *Attorney, Agent, or Firm*—Doreen M. Wells

(57) ABSTRACT

An ink jet ink set and recording element combination including A) a porous ink jet recording element having a 60° specular gloss of at least about 5; and B) a pigment based ink jet ink set including at least two inks; wherein the RGD value is less than 40% and RGV value among inks is less than 10% when 60° is used as the specular angle; the RGD and RGV values are calculated according to Equations (A) and (B), respectively:

Equation (A)
$$RGD\% = \frac{\sum_{I=1}^{N} |Gloss(Imaged\ Areas)_I - Gloss(Non\ Imaged\ Areas)|}{\sum_{I=1}^{N} Gloss(Imaged\ Areas)_I}$$

Equation (B)
$$RGV(\%) = \frac{\sum_{I=1}^{N} |(Gloss(Imaged\ Area)_I - AG)|}{AG} \Big/ N$$

Where $$AG = \frac{\sum_{I=1}^{N} Gloss(Imaged\ Area)_I}{N}$$

I is a variable which identifies a certain color patch used in the evaluation,

N is the total number of color patches used in the evaluation.

26 Claims, No Drawings

MATERIALS FOR REDUCING INTER-COLOR GLOSS DIFFERENCE

CROSS REFERENCE TO RELATED APPLICATIONS

This application relates to commonly assigned copending application Ser. No. 10/034,721 entitled INK JET INK SET; application Ser. No. 10/033,229 entitled INK JET INK SET/RECEIVER COMBINATION; application Ser. No. 10/034,285 entitled A METHOD OF SELECTING INK JET INKS IN A COLOR SET and application Ser. No. 10/032,931 entitled A METHOD OF SELECTING INK JET INKS IN A COLOR SET filed simultaneously herewith. These copending applications are incorporated by reference herein for all that they contain.

FIELD OF THE INVENTION

This invention relates to a combination of ink jet color ink set and a porous ink jet recording element for inkjet printing that provides images with improved gloss difference in imaged and non-imaged areas as well as inter-color gloss difference.

BACKGROUND OF THE INVENTION

In a typical ink jet recording or printing system, ink droplets are ejected from a nozzle at high speed towards a recording element or medium to produce an image on the medium. The ink droplets, or recording liquid, generally comprise a recording agent, such as a dye or pigment, and a large amount of solvent. The solvent, or carrier liquid, typically is made up of water and an organic material such as a monohydric alcohol, a polyhydric alcohol or mixtures thereof.

An ink jet recording element typically comprises a support having on at least one surface thereof an ink-receiving or image-receiving layer, and includes those intended for reflection viewing, which have an opaque support, and those intended for viewing by transmitted light, which have a transparent support.

An important characteristic of ink jet recording elements is their need to dry quickly after printing. To this end, porous recording elements have been developed which provide nearly instantaneous drying as long as they have sufficient thickness and pore volume to effectively contain the liquid ink. For example, a porous recording element can be manufactured by cast coating, in which a particulate-containing coating is applied to a support and is dried in contact with a polished smooth surface.

One of the major disadvantages of the current ink jet recording element is "differential gloss", particular on images printed using pigment-based inks. In pigment-based inks, the colorant exists as discrete particles. These pigment particles are usually treated with addenda known as dispersants or stabilizers which serve to keep the pigment particles from agglomerating and/or settling out. Therefore, when the pigment-based inks are printed on recording elements having glossy surfaces, the inks on the imaged areas tend to stay on the surface of the receiver. "Differential gloss" may include both "image and non-image differential gloss" and "inter-color differential gloss". "Image and non-image differential gloss" describes the image artifact where the gloss of the non-imaged areas is very different from that of imaged areas. "Inter-color differential gloss" describes the image artifact where the gloss levels of imaged areas of different colors are very different from each other. Both types of image quality defects can be quite noticeable, even to ordinary observers. Although not designed to improve "differential gloss", one possible solution to this problem is to cover the entire receiver with a protective layer through techniques such as laminating the printed image, or fusing the top fusible polymeric layer in receivers to a continuous overcoat layer, such as those disclosed in U.S. patent application, Ser. No. 09/954,779, filed on Sep. 18, 2001 of Wexler, or coating a protective layer on the imaged areas as described in EP 1057646 and EP 1048466. However, all these approaches involve separate steps after printing, making the entire process complex and costly.

What the art needs is a way to minimize gloss level variations in imaged and non-imaged areas as well as those among different colors when the various inks are deposited and dried on a receiver. This should be done as part of the printing process and not as a separate step after printing.

SUMMARY OF THE INVENTION

The present invention provides an ink jet color ink set and receiver combination that is capable of producing images wherein the gloss level variations between imaged and non-imaged areas as well as that among different colors in the color image are simultaneously minimized. The gloss variation is judged after the ink is deposited and dried on a receiver, but the invention is a part of the ink and receiver selection and printing process; not a separate step after printing.

In accordance with the invention, the gloss level of the ink is predetermined, as measured from single color patches on a receiver. The gloss level of the receiver is also determined under a similar measurement condition. The gloss level variability among different inks as well as the relative gloss difference between the imaged and non-imaged areas are both calculated. By simultaneously keeping the relative gloss difference of the ink and receiver combination as well as the gloss variability with a certain range, the quality of the image is improved.

Hence, the present invention discloses an ink jet ink set and recording element combination comprising:

A) a porous ink jet recording element having a 60° specular gloss of at least about 5; and B) a pigment based ink jet ink set comprising at least two inks;

wherein the RGD value is less than 40% and RGV value among inks is less than 10% when 60° is used as the specular angle; the RGD and RGV values are calculated according to Equations (A) and (B), respectively:

$$RGD\ \% = \frac{\sum_{I=1}^{N} |\text{Gloss(Imaged Areas)}_I - \text{Gloss(Non Imaged Areas)}|}{\sum_{I=1}^{N} \text{Gloss(Imaged Areas)}_I} \quad \text{Equation (A)}$$

$$RGV\ (\%) = \frac{\sum_{I=1}^{N} |\text{Gloss(Imaged Area)}_I - AG|}{AG} \Big/ N \quad \text{Equation (B)}$$

Where $$AG = \frac{\sum_{I=1}^{N} \text{Gloss(Imaged Area)}_I}{N}$$

I is a variable which identifies a certain color patch used in the evaluation,

N is the total number of color patches used in the evaluation.

The advantage of the invention is that it minimizes gloss difference between the imaged and non-imaged areas as well as among different colors in a printed color image on the receiver and this is done as a part of the initial printing process.

DETAILED DESCRIPTION OF THE INVENTION

Ink Set and Receiver Gloss Matching

Gloss, commonly referred to as specular gloss, of a surface is defined as its degree of approach to a mirror-like surface. It is a measure of the amount of energy reflected at a reflection angle equal to or near the angle of incidence. Specular gloss can be measured in terms of gloss units, at several angles, e.g. 20°, 30°, 45°, 60°, 75° and 80° from the surface normal. Gloss meters are used to measure the gloss of a sample at various angles. The BYK-Gardner micro-TRI-glossmeter is an example of such an instrument.

The porous receiver used in this invention refers to an ink-recording element having a 60° specular gloss level of 5 or higher. An ink jet recording element typically comprises a support having on at least one surface thereof an ink-receiving or image-forming layer, the ink-receiving layer is a porous layer which imbibes the ink via capillary action. The gloss level of the receiver can be achieved through receiver layer design and the properties of components in each layer, such as particle sizes of the surface coating, surface roughness of the support, etc. For example, possibly by varying the inorganic particle sizes in the ink-receiving layer, 60° gloss level of Kodak Instant-Dry Photographic Glossy Media Cat 8103137 has reached a value of about 64. In comparison, the 60° gloss level of Epson Photoglossy Paper® SP91001 is only about 34. In addition, as known in the art, gloss level can be modified by changing the surface smoothness of the support within a receiver. For example, by changing the surface smoothness of the chill roll (e.g. a F-surface versus a textured E-surface) used in the resin coating step of the support manufacturing, Kodak Instant-Dry Photographic media has a wide range of gloss level from a 60° gloss level of about 30 (Satin Media Cat 8648263) to that of 64 (Glossy Media Cat 8103137).

When inks are printed on a receiver, the gloss level of the printed image is determined by both ink and receiver. Ink properties, such as, for example, the refractive index of polymers in the inks, the film forming property of the polymers in the inks after printing, and the ink load deposit on the receiver, may individually or in combination influence the gloss of a printed image. For pigment-based inks, pigment particle size and distribution, and the use of non-film forming particles can also have a significant impact on the gloss levels, such as those disclosed in U.S. patent application, Ser. No. 10/034,721, of Chen et al. filed simultaneously herewith. The present inventors have discovered that when the gloss level of the receiver is designed to match the gloss levels generated from the ink set, the printed images have less observable differential gloss between imaged and non-imaged areas. Furthermore, by keeping the gloss level variability among different inks with a certain range, the printed images have less observable inter-color gloss difference. Both of them help to improve the image quality of the overall print.

In this invention, the match between the receiver and ink set is characterized by a parameter called Relative Gloss Difference (RGD) as defined in Equation A. The inter-color gloss difference is characterized by a parameter called Relative Gloss Variability (RGV), which is derived from Average Gloss (AG) as defined in Equation B.

Equation (A)

$$RGD \% = \frac{\sum_{I=1}^{N} |\text{Gloss(Imaged Areas)}_I - \text{Gloss(Non Imaged Areas)}|}{\sum_{I=1}^{N} \text{Gloss(Imaged Areas)}_I}$$

Equation (B)

$$RGV\ (\%) = \frac{\sum_{I=1}^{N} |(\text{Gloss(Imaged Area)}_I - AG)|}{AG} \Big/ N$$

Where $$AG = \frac{\sum_{I=1}^{N} \text{Gloss(Imaged Area)}_I}{N}$$

I is a variable which identifies a certain color patch used in the evaluation,

N is the total number of color patches used in the evaluation.

In this invention, RGD and RGV are obtained based on the following procedure: load into a printer a selected ink set comprising at least 2 inks and then print onto the recording elements of this invention using a test image. The test image is designed to include single color patches of Dmax density (100% dot coverage). The size of the patch needs to be large enough, for example, approximately 3 by 3 centimeters in size for uniform gloss measurement. The dot coverage is also important in order to minimize the gloss contribution from local areas not covered by the inks at the pixel level. Usually, a reflection density of 1.5 (Dmax) can be achieved at 100% dot coverage. The color used in the evaluation may include any combination of colors capable of being generated by the selected ink set, such as primary colors (for example, cyan, magenta, yellow, black) or, optional secondary colors (for example, red, green, blue), process black (a combination of cyan, magenta and yellow) or 400% black (a combination of cyan, magenta, yellow and black). After allowing the printed test images to dry for 24 hours at ambient temperature and humidity, the gloss level at a certain specular angle (for example, 60 degree) of each color patch is then measured, using a gloss meter, for example, the BYK-Gardner micro-TRI-glossmeter. Under the same condition, the gloss level of the receiver (non-imaged areas) is also measured.

It is preferred that the combination of ink set and the porous ink jet recording element is capable of generating RGD values of less than 40% (when 60 degree is used as the specular angle) and RGV value among inks of less than 10%

(when 60 degree is used as the specular angle). It is further preferred that the combination of ink set and the porous ink jet recording element is capable of generating RGD values of less than 30% (when 60 degree is used as the specular angle) and RGV value among inks of less than 7% (when 60 degree is used as the specular angle).

Ink Jet Recording Element

The support for the ink jet recording element used in the invention can be any of those usually used for ink jet receivers, such as resin-coated paper, paper, polyesters, or microporous materials such as polyethylene polymer-containing material sold by PPG Industries, Inc., Pittsburgh, Pa. under the trade name of Teslin®, Tyvek® synthetic paper (DuPont Corp.), and OPPalyte® films (Mobil Chemical Co.) and other composite films listed in U.S. Pat. No. 5,244,861. Opaque supports include plain paper, coated paper, synthetic paper, photographic paper support, melt-extrusion-coated paper, and laminated paper, such as biaxially oriented support laminates. Biaxially oriented support laminates are described in U.S. Pat. Nos. 5,853,965; 5,866,282; 5,874,205; 5,888,643; 5,888,681; 5,888,683; and 5,888,714, the disclosures of which are hereby incorporated by reference. These biaxially oriented supports include a paper base and a biaxially oriented polyolefin sheet, typically polypropylene, laminated to one or both sides of the paper base. Transparent supports include glass, cellulose derivatives, e.g., a cellulose ester, cellulose triacetate, cellulose diacetate, cellulose acetate propionate, cellulose acetate butyrate; polyesters, such as poly(ethylene terephthalate), poly(ethylene naphthalate), poly(1,4-cyclohexanedimethylene terephthalate), poly(butylene terephthalate), and copolymers thereof; polyimides; polyamides; polycarbonates; polystyrene; polyolefins, such as polyethylene or polypropylene; polysulfones; polyacrylates; polyetherimides; and mixtures thereof The papers listed above include a broad range of papers, from high end papers, such as photographic paper to low end papers, such as newsprint. In a preferred embodiment, polyethylene-coated paper is employed.

The support used in the invention may have a thickness of from about 50 to about 500 $\mu$m, preferably from about 75 to 300 $\mu$m. Antioxidants, antistatic agents, plasticizers and other known additives may be incorporated into the support, if desired.

The ink-receiving layer for the ink jet recording element used in the invention can be porous. In a preferred embodiment of the invention, the porous ink-receiving layer contains particles. Examples of particles useful in the invention include alumina, boehmite, clay, calcium carbonate, titanium dioxide, calcined clay, aluminosilicates, silica, barium sulfate, or polymeric beads. The particles may be porous or nonporous. In a preferred embodiment of the invention, the particles are metallic oxides, preferably fumed. While many types of inorganic and organic particles are manufactured by various methods and commercially available for an image-receiving layer, porosity of the ink-receiving layer is necessary in order to obtain very fast ink drying. The pores formed between the particles must be sufficiently large and interconnected so that the printing ink passes quickly through the layer and away from the outer surface to give the impression of fast drying. At the same time, the particles must be arranged in such a way so that the pores formed between them are sufficiently small that they do not scatter visible light.

The particles may be in the form of primary particles, or in the form of secondary aggregated particles. The aggregates are comprised of smaller primary particles about 7 to about 40 nm in diameter, and being aggregated up to about 300 nm in diameter. The pores in a dried coating of such aggregates fall within the range necessary to ensure low optical scatter yet sufficient ink solvent uptake.

Any fumed metallic oxide particles may be used in the invention. Examples of such particles include fumed alumina, silica, titania, cationic silica, antimony(III) oxide, chromium(III) oxide, iron(III) oxide, germanium(IV) oxide, vanadium(V) oxide, or tungsten(VI) oxide. Preferred examples of fumed metallic oxides which may be used in the invention include silica and alumina fumed oxides. Fumed oxides are available in dry form or as dispersions of the aggregates mentioned above.

The image-receiving layer may also contain a mordant. Examples of mordants which may be used include water-soluble cationic polymers, metal salts, water-insoluble cationic polymeric particles in the form of a latex, water dispersible polymer, beads, or core/shell particles wherein the core is organic or inorganic and the shell in either case is a cationic polymer. Such particles can be products of addition or condensation polymerization, or a combination of both. They can be linear, branched, hyper-branched, grafted, random, blocked, or can have other polymer microstructures well known to those in the art. They also can be partially crosslinked.

For the porous image-receiving layer comprising particles, the void volume must be sufficient to absorb all of the printing ink. For example, if a porous layer has 60 volume % open pores, in order to instantly absorb 32 cc/m$^2$ of ink, it must have a physical thickness of at least about 54 $\mu$m.

In order to improve the adhesion of the ink-receiving layer to the support, the surface of the support may be subjected to a corona-discharge treatment prior to applying the image-receiving layer.

Coating compositions employed in the invention may be applied by any number of well known techniques, including dip-coating, wound-wire rod coating, doctor blade coating, gravure and reverse-roll coating, slide coating, bead coating, extrusion coating, curtain coating and the like. Known coating and drying methods are described in further detail in Research Disclosure no. 308119, published December 1989, pages 1007 to 1008. Slide coating is preferred, in which the base layers and overcoat may be simultaneously applied. After coating, the layers are generally dried by simple evaporation, which may be accelerated by known techniques such as convection heating.

To improve colorant fade, UV absorbers, radical quenchers or antioxidants may also be added to the image-receiving layer as is well known in the art. Other additives include pH modifiers, adhesion promoters, rheology modifiers, surfactants, biocides, lubricants, dyes, optical brighteners, matte agents, antistatic agents, etc. In order to obtain adequate coatability, additives known to those familiar with such art such as surfactants, defoamers, alcohol and the like may be used. A common level for coating aids is 0.01 to 0.30% active coating aid based on the total solution weight. These coating aids can be nonionic, anionic, cationic or amphoteric. Specific examples are described in MCCUTCHEON's Volume 1: Emulsifiers and Detergents, 1995, North American Edition.

The coating composition can be coated either from water or organic solvents, however water is preferred. The total solids content should be selected to yield a useful coating thickness in the most economical way, and for particulate coating formulations, solids contents from 10–40% are typical.

Pigment Milling and Ink formulation

The process of preparing inks from pigments commonly involves two steps: (a) a dispersing or milling step to break up the pigment to the primary particle, and (b) dilution step in which the dispersed pigment concentrate is diluted with a carrier and other addenda to a working strength ink. In the milling step, the pigment is usually suspended in a carrier (typically the same carrier as that in the finished ink) along with rigid, inert milling media. Mechanical energy is supplied to this pigment dispersion, and the collisions between the milling media and the pigment cause the pigment to deaggregate into its primary particles. A dispersant or stabilizer, or both, is commonly added to the pigment dispersion to facilitate the deaggregation of the raw pigment, to maintain colloidal particle stability, and to retard particle reagglomeration and settling.

There are many different types of materials which may be used as milling media, such as glasses, ceramics, metals, and plastics. In a preferred embodiment, the grinding media can comprise particles, preferably substantially spherical in shape, e.g., beads, consisting essentially of a polymeric resin. In general, polymeric resins suitable for use as milling media are chemically and physically inert, substantially free of metals, solvent and monomers, and of sufficient hardness and firability to enable them to avoid being chipped or crushed during milling. Suitable polymeric resins include crosslinked polystyrenes, such as polystyrene crosslinked with divinylbenzene, styrene copolymers, polyacrylates such as poly(methyl methylacrylate), olycarbonates, polyacetals, such as Derlin™, vinyl chloride polymers and copolymers, polyurethanes, polyamides, poly(tetrafluoroethylenes), e.g., Teflon™, and other fluoropolymers, high density polyethylenes, polypropylenes, cellulose ethers and esters such as cellulose acetate, poly(hydroxyethylmethacrylate), poly(hydroxyethylacrylate), silicone containing polymers such as polysiloxanes and the like. The polymer can be biodegradable. Exemplary biodegradable polymers include poly(lactides), poly(glycolids) copolymers of lactides and glycolide, polyanhydrides, poly(imino carbonates), poly(N-acylhydroxyproline) esters, poly(N-palmitoyl hydroxyprolino) esters, ethylene-vinyl acetate copolymers, poly(orthoesters), poly(caprolactones), and poly(phosphazenes). The polymeric resin can have a density from 0.9 to 3.0 g/cm3. Higher density resins are preferred inasmuch as it is believed that these provide more efficient particle size reduction. Most preferred are crosslinked or uncrosslinked polymeric media based on styrene.

Milling can take place in any suitable grinding mill. Suitable mills include an air jet mill, a roller mill, a ball mill, an attritor mill and a bead mill. A high speed mill is preferred. By high speed mill we mean milling devices capable of accelerating milling media to velocities greater than about 5 meters per second. Sufficient milling media velocity is achieved, for example, in Cowles-type saw tooth impeller having a diameter of 40 mm when operated at 9,000 rpm. The preferred proportions of the milling media, the pigment, the liquid dispersion medium and dispersant can vary within wide limits and depends, for example, up on the particular material selected and the size and density of the milling media etc. After milling is complete, the dispersion of active material is separated from the grinding media by simple sieving or filtration. With either of the above modes the preferred amounts and ratios of the ingredients of the mill grind will vary widely depending upon the specific materials and the intended applications. The contents of the milling mixture comprise the mill grind and the milling media. The mill grind comprises pigment, dispersant and a liquid carrier such as water. For aqueous ink jet inks, the pigment is usually present in the mill grind at 1 to 50 weight %, excluding the milling media. The weight ratio of pigment to dispersant is 20:1 to 1:2. The high speed mill is a high agitation device, such as those manufactured by Morehouse-Cowles, Hockmeyer et al.

The dispersant is another important ingredient in the mill grind.

Preferred dispersants used in the present invention include sodium dodecyl sulfate, acrylic and styrene-acrylic copolymers, such as those disclosed in U. S. Pat. Nos. 5,085,698 and 5,172,133, and sulfonated polyesters and styrenics, such as those disclosed in U.S. Pat. No. 4,597,794. Other patents referred to above in connection with pigment availability also disclose a wide variety of dispersant to select from. The dispersant used in the examples is potassium N-methyl-N-oleoyl taurate (K-OMT).

The milling time can vary widely and depends upon the pigment, mechanical means and residence conditions selected, the initial and desired final particle size, etc. For aqueous mill grinds using the preferred pigments, dispersants, and milling media described above, milling times will typically range from 1 to 100 hours. The milled pigment concentrate is preferably separated from the milling media by filtration.

The pigment particles useful in the invention may have any particle sizes which can be jetted through a print head. Preferably, the pigment particles have a mean particle size of less than about 0.5 micron, more preferably less than about 0.2 micron.

A wide variety of organic and inorganic pigments, alone or in combination, may be selected for use in the present invention. Colorant particles which may be used in the invention include pigments as disclosed, for example in U.S. Pat. Nos. 5,026,427; 5,086,698; 5,141,556; 5,160,370; and 5,169,436, the disclosures of which are hereby incorporated by reference. The exact choice of pigments will depend upon the specific application and performance requirements such as color reproduction and image stability. Pigments suitable for use in the present invention include, for example, azo pigments, monoazo pigments, disazo pigments, azo pigment lakes, β-Naphthol pigments, Naphthol AS pigments, benzimidazolone pigments, disazo condensation pigments, metal complex pigments, isoindolinone and isoindoline pigments, polycyclic pigments, phthalocyanine pigments, quinacridone pigments, perylene and perinone pigments, thioindigo pigments, anthrapyrimidone pigments, flavanthrone pigments, anthanthrone pigments, dioxazine pigments, triarylcarbonium pigments, quinophthalone pigments, diketopyrrolo pyrrole pigments, titanium oxide, iron oxide, and carbon black. Typical examples of pigments which may be used include Color Index (C. I.) Pigment Yellow 1, 2, 3, 5, 6, 10, 12, 13, 14, 16, 17, 62, 65, 73, 74, 75, 81, 83, 87, 90, 93, 94, 95, 97, 98, 99, 100, 101, 104, 106, 108, 109, 110, 111, 113, 114, 116, 117, 120, 121, 123, 124, 126, 127, 128, 129, 130, 133, 136, 138, 139, 147, 148, 150, 151, 152, 153, 154, 155, 165, 166, 167, 168, 169, 170, 171, 172, 173, 174, 175, 176, 177, 179, 180, 181, 182, 183, 184, 185, 187, 188, 190, 191, 192, 193, 194; C. I. Pigment Orange 1, 2, 5, 6, 13, 15, 16, 17, 17:1, 19, 22, 24, 31, 34, 36, 38, 40, 43, 44, 46, 48, 49, 51, 59, 60, 61, 62, 64, 65, 66, 67, 68, 69, C. I. Pigment Red 1, 2, 3, 4, 5, 6, 7, 8, 9, 10, 11, 12, 13, 14, 15, 16, 17, 18, 21, 22, 23, 31, 32, 38, 48:1, 48:2, 48:3, 48:4, 49:1, 49:2, 49:3, 50:1, 51, 52:1, 52:2, 53:1, 57:1, 60:1, 63:1, 66, 67, 68, 81, 95, 112, 114, 119, 122, 136, 144, 146, 147, 148, 149, 150, 151, 164, 166, 168, 169, 170, 171, 172, 175, 176, 177, 178, 179, 181, 184, 185, 187, 188, 190, 192, 194, 200, 202, 204, 206, 207, 210, 211, 212, 213, 214, 216, 220, 222, 237, 238, 239, 240, 242, 243, 245, 247, 248, 251, 252, 253, 254, 255, 256, 258, 261, 264, C.I. Pigment Violet 1, 2, 3, 5:1, 13, 19, 23, 25, 27, 29, 31, 32, 37, 39, 42, 44, 50, C.I. Pigment Blue 1, 2, 9, 10, 14, 15:1, 15:2, 15:3, 15:4, 15:6, 15, 16, 18, 19, 24:1, 25, 56, 60, 61, 62, 63, 64, 66; C.I. Pigment Green 1, 2, 4, 7, 8, 10, 36, 45; C.I. Pigment Black 1, 7, 20, 31, 32, and C.I. Pigment Brown 1, 5, 22, 23, 25, 38, 41, 42. In a preferred embodiment of the invention, the pigment is C.I. Pigment Blue 15:3, C.I. Pigment Red 122, C.I. Pigment Yellow 155, C.I. Pigment Yellow 74, C.I. Pigment Black 7 or bis(phthalocyanylalumino)tetraphenyldisiloxane as described in U.S. Pat. No. 4,311,775, the contents of which are incorporated herein by reference.

The pigment used in element of the invention is present in the ink jet ink in any effective amount, generally from about 0.1 to about 10% by weight, and preferably from about 0.5% to about 6% by weight.

Typically, the aqueous carrier for the ink composition is water or a mixture of water and at least one water miscible co-solvent. Selection of a suitable mixture depends on requirements of the specific application, such as desired surface tension and viscosity, the selected pigment or dye, drying time of the ink jet ink, and the type of paper onto which the ink will be printed. Representative examples of water-miscible co-solvents that may be selected include (1) alcohols, such as methyl alcohol, ethyl alcohol, n-propyl alcohol, isopropyl alcohol, n-butyl alcohol, sec-butyl alcohol, t-butyl alcohol, iso-butyl alcohol, furfuryl alcohol, and tetrahydrofurfuryl alcohol; (2) ketones or ketoalcohols such as acetone, methyl ethyl ketone and diacetone alcohol; (3) ethers, such as tetrahydrofuran and dioxane; (4) esters, such as ethyl acetate, ethyl lactate, ethylene carbonate and propylene carbonate; (5) polyhydric alcohols, such as ethylene glycol, diethylene glycol, triethylene glycol, tetraethylene glycol, propylene glycol, polyethylene glycol, glycerol, 2-methyl-2,4-pentanediol 1,2,6-hexanetriol and thioglycol; (6) lower alkyl mono- or di-ethers derived from alkylene glycols, such as ethylene glycol mono-methyl (or -ethyl) ether, diethylene glycol mono-methyl (or -ethyl) ether, diethylene glycol mono-butyl (or -ethyl) ether, propylene glycol mono-methyl (or -ethyl) ether, poly(ethylene glycol) butyl ether, triethylene glycol mono-methyl (or -ethyl) ether and diethylene glycol di-methyl (or -ethyl) ether; (7) nitrogen containing cyclic compounds, such as pyrrolidone, N-methyl-2-pyrrolidone, and 1,3-dimethyl-2-imidazolidinone; and (8) sulfur-containing compounds such as dimethyl sulfoxide, 2,2'-thiodiethanol, and tetramethylene sulfone.

Typically, the amount of aqueous carrier employed is in the range of approximately 70 to 98 weight %, preferably approximately 90 to 98 weight %, based on the total weight of the ink. A mixture of water and a polyhydric alcohol, such as diethylene glycol, is useful as an aqueous carrier. In a preferred embodiment, the inks contain from about 5 to about 60 weight % of water miscible organic solvent. Percentages are based on the total weight of the aqueous carrier.

Other additives which may optionally be present in the ink jet ink compositions include thickeners, conductivity enhancing agents, anti-kogation agents, drying agents, waterfast agents, dye solubilizers, chelating agents, binders, light stabilizers, viscosifiers, buffering agents, anti-mold agents, anti-curl agents, stabilizers and defoamers.

Additionally, the ink compositions can include a humectant, a surfactant, a penetrant, a biocide, etc. as is required depending on the application.

A humectant is usually employed in the ink jet compositions of the invention to help prevent the ink from drying out or crusting in the orifices of the printhead. Examples of humectants which can be used include polyhydric alcohols, such as ethylene glycol, diethylene glycol(DEG), triethylene glycol, propylene glycol, tetraethylene glycol, polyethylene glycol, glycerol, 2-methyl-2,4-pentanediol, 2-ethyl-2-hydroxymethyl-1,3-propanediol(EHMP), 1,5 pentanediol, 1,2-hexanediol, 1,2,6-hexanetriol and thioglycol; lower alkyl mono- or di-ethers derived from alkylene glycols, such as ethylene glycol mono-methyl or mono-ethyl ether, diethylene glycol mono-methyl or mono-ethyl ether, propylene glycol mono-methyl or mono-ethyl ether, triethylene glycol monomethyl, mono-ethyl or mono-butyl ether (TEGMBE), diethylene glycol di-methyl or di-ethyl ether, poly(ethylene glycol) monobutyl ether (PEGMBE), and diethylene glycol monobutylether(DEGMBE); nitrogen-containing compounds, such as urea, 2-pyrrolidinone, N-methyl-2-pyrrolidinone, and 1,3-dimethyl-2-imidazolidinone; and sulfur-containing compounds such as dimethyl sulfoxide and tetramethylene sulfone, etc.

Preferred humectants for the inks of the invention include DEG, glycerol, DEGMBE, TEGMBE, 1,2-hexanediol, 1,5-pentanediol, urea, 2-pyrrolidinone, EHMP and mixtures thereof. The humectant may be employed in each ink in an amount of from about 5 to about 60 weight percent.

Surfactants may be added to the ink to adjust the surface tension to an appropriate level. The surfactants may be anionic, cationic, amphoteric or nonionic and used at levels of 0.01 to 1% of the ink composition. Preferred surfactants include Surfynol® 465 (available from Air Products Corp.) and Tergitol® 15-S-5 (available from Union Carbide).

A penetrant (0–10% by weight) may also be added to the ink composition employed in the process of the invention to help the ink penetrate the receiving substrate, especially when the substrate is a highly sized paper. Examples of such penetrants include alcohols, such as methyl alcohol, ethyl alcohol, n-propyl alcohol, isopropyl alcohol, n-butyl alcohol, sec-butyl alcohol, t-butyl alcohol, iso-butyl alcohol, furfuryl alcohol, and tetrahydrofurfuryl alcohol; ketones or ketoalcohols such as acetone, methyl ethyl ketone and diacetone alcohol; ethers, such as tetrahydrofuran and dioxane; and esters, such as, ethyl lactate, ethylene carbonate and propylene carbonate.

A biocide may be added to the ink composition employed in the invention to suppress the growth of microorganisms such as molds, fungi, etc. in aqueous inks. A preferred biocide for the ink composition employed in the present invention is Proxel® GXL (Avecia Corp.) at a final concentration of 0.0001–0.5 wt. %.

The pH of the aqueous ink compositions employed in the invention may be adjusted by the addition of organic or inorganic acids or bases. Useful inks may have a preferred pH of from about 2 to 10, depending upon the type of dye being used. Typical inorganic acids include hydrochloric, phosphoric and sulfuric acids. Typical organic acids include methanesulfonic, acetic and lactic acids. Typical inorganic bases include alkali metal hydroxides and carbonates. Typical organic bases include ammonia, triethanolamine (TEA) and tetramethylethlenediamine.

A film-forming polymeric resin may be added to the ink composition, to improve the wet and dry rub resistance of the printed images. Preferably, the film forming polymeric resin is water dispersible. The polymers used in the element of this invention are generally hydrophobic polymers of any composition that can be stabilized in a water-based medium. Such hydrophobic polymers are generally classified as either condensation polymer or addition polymers. Condensation polymers include, for example, polyesters, polyamides, polyurethanes, polyureas, polyethers, polycarbonates, polyacid anhydrides, and polymers comprising combinations of the above-mentioned types. Addition polymers are polymers formed from polymerization of vinyl-type monomers including, for example, allyl compounds, vinyl ethers, vinyl heterocyclic compounds, styrenes, olefins and halogenated olefins, ethylenically unsaturated carboxylic acids and esters derived from them, unsaturated nitriles, vinyl alcohols, acrylamides and methacrylamides, vinyl ketones, multifunctional monomers, or copolymers formed from various combinations of these monomers.

Preferred film-forming polymeric resin includes those styrene/acrylic polymers prepared by free-radical polymerization of vinyl monomers in aqueous emulsion, polyester ionomers such as Eastman AQ® polyesters, (Eastman Chemical Company) including Eastman Polyesters AQ 29, AQ 38, and AQ 55, and polyurethanes, such as those disclosed in U.S. patent application, Ser. No. 09/548,514, filed Apr. 13, 2000, of Yacobucci et al., the disclosure of which is hereby incorporated by reference, Witcobond® polyurethane dispersion by Witco Corp. and Sancure® polyurethane by BF Goodrich Company.

The water dispersible film-forming polymeric resin used in the ink set of the invention is present in the composition in any effective amount, generally from about 0.1 to about 10% by weight, and preferably from about 0.5% to about 5% by weight.

The ink can further comprise non film-forming particles, including polymer particles and inorganic particles such as silica, alumina, titanium dioxide, clay, calcium carbonate, barium sulfate, or zinc oxide. It is preferred that the polymer particles have a glass transition temperature greater than 60° C. More preferably, the polymer should have a glass transition temperature greater than 80° C.

The non-film forming particles used in the ink set of the invention is present in the composition in any effective amount, generally from about 0.1 to about 10% by weight, and preferably from about 0.5% to about 5%by weight. The mean particles size of the non-film forming particles used in the invention is generally in the range of 0.01 to 1 $\mu$m, more preferably 0.03 to 0.5 $\mu$m.

Although the recording elements disclosed herein have been referred to primarily as being useful for ink jet printers, they also can be used as recording media for pen plotter assemblies. Pen plotters operate by writing directly on the surface of a recording medium using a pen consisting of a bundle of capillary tubes in contact with an ink reservoir.

The following example is provided to illustrate the invention.

EXAMPLES

Preparation of Pigment Dispersion

Cyan Pigment Dispersion

The cyan pigment dispersion contains: 8000 g of Polymeric beads, mean diameter of 50 $\mu$m (milling media); 1600 g of Bridged aluminum phthalocyanine pigment (Eastman Kodak); 960 g of Oleoyl methyl taurine, (OMT) Potassium salt and 5440 g of Deionized water.

The above components were milled in a 40 liter double walled vessel obtained from BYK-Gardner using a high energy media mill manufactured by Morehouse-Cowles Hochmeyer. The mill was run for approximately 8 hours at room temperature. During the milling process, two batches of pigment samples (15.0 g each) as PC-1 and PC-2 were obtained such that the median pigment particle sizes are about 30 nm and 100 nm as measured by MICROTRAC II Ultrafine particle analyzer (UPA) manufactured by Leeds & Northrup. The medium particle size represents that 50% of the volume in the sample is smaller than the indicated size. The dispersion was separated from the milling media by filtering the mill grind through a 4–8 $\mu$m KIMAX® Buchner Funnel obtained from VWR Scientific Products. Additional 8000 g of dilution water was added to the filtered dispersion followed by a biocide, Proxel® GXL (Zeneca Corp.). The pigment is about 10.0% by weight of the total final dispersion and the biocide is about 230 ppm by weight of the total final dispersion.

Yellow Pigment Dispersion

This dispersion was prepared the same as the Cyan Pigment Dispersion 1 except that Pigment Yellow 155 (Clariant Corp.) was used instead of Bridged aluminum phthalocyanine pigment. The amount of OMT Potassium salt as 25 weight % based on the pigment. During the milling process, two batches of pigment samples (15.0 g each) as PY-1 and PY-2 were obtained such that the median pigment particle sizes are about 110 nm and 130 nm as measured as measured by MICROTRAC II Ultrafine particle analyzer (UPA) manufactured by Leeds & Northrup.

Ink-Y1

To prepare the Ink-Y1, 2.5 g of Pigment Dispersion PY-1 (10% active), 0.05 g Surfynol® 465 (Air Products Inc.), 0.8 g glycerol, 1.0 g triethylene glycol and 0.3 g di(propyleneglycol) methyl ether (Dowanol® DPM), and 0.33 g of AQ55® (30.5% active) were added together with distilled water so that the final weight of the ink was 10.0 g. The final ink contained 2.5% Pigment Yellow 155, 0.50% Surfynol® 465, 8.0% glycerol, 10.0% triethylene glycol, 3% di(propyleneglycol) methyl ether and 1% AQ55®. The solution was filtered through a 3 $\mu$m polytetrafluoroethylene filter and filled into an empty Epson 660 ink jet cartridge.

Ink-Y2

Ink Y2 was prepared similar to Ink-Y1 except that pigment dispersion PY-2 was used instead of pigment dispersion PY-1.

Ink-C1

Ink C1 was prepared similar to lnk-Y1 except that 2.2 g bridged aluminum phthalocyanine pigment dispersion PC-1 (10% active) was used instead of pigment dispersion PY-1. The final ink contained 2.2% by weight of bridged aluminum phthalocyanine pigment.

Ink-C2

Ink C2 was prepared similar to Ink-C1 except that pigment dispersion PC-2 was used instead of pigment dispersion PC-1.

Ink-M1

Ink M1 was obtained from the dark magenta channel of Epson 2000P Color Cartridges, CAT. No.T106201. The ink was then refilled into an Epson 660 empty cartridge.

Ink-M2

Ink M2 was obtained from Epson C80 magenta cartridges, CAT. No.T032320. The ink was then refilled into an Epson 660 empty cartridge.

Ink Set 1 (S-1)

Ink Set 1 is a tri-color ink set consisting of cyan, magenta and yellow, obtained from Epson C80 cartridges, CAT. No.T032220, T032320, T032420, respectively.

Ink Set 2 (S-2)

Ink Set 1 is a tri-color ink set consisting of dark cyan, dark magenta and yellow inks obtained from Epson 2000P Color Cartridges, CAT. No.T106201.

Ink Set 3 (S-3)

Inks-C1, M1, and Y1 were used as a set of cyan, magenta, and yellow, and filled into the C, M, Y Channels of an Epson 660 empty Color cartridges, respectively.

Ink Set 4 (S-4)

Inks-C2, M2, and Y2 were used as a set of cyan, magenta, and yellow, and filled into the C, M, Y Channels of an Epson 660 empty Color cartridges, respectively.

Receiver 1 (R-1)

Receiver R-1 was Kodak Instant-Dry Photographic Glossy Media Cat 8103137, which is aporous, glossy receiver.

Receiver 2 (R-2)

Receiver R-2 was Epson Photoglossy Paper® SP91001, (Epson Corporation), which is a porous, glossy receiver.

Element 1 of the Invention (I-1)

Element 1 (I-1) of the invention is a combination of Ink set 3 (S-3) and Receiver 1 (R-1).

Element 2 of the Invention (I-2)

Element 2 (I-2) of the invention is a combination of Ink set 4 (S-4) and Receiver 1 (R-1).

Comparative Element 1 (Comp-1)

Comparative Element 1 (Comp-1) is a combination of Ink set 1 (S-1) and Receiver 2 (R-2).

Comparative Element 2 (Comp-2)

Comparative Element 2 (Comp-2) is a combination of Ink set 2 (S-2) and Receiver 2 (R-2).

Comparative Element 3 (Comp-3)

Comparative Element 3 (Comp-3) is a combination of Ink set 2 (S-3) and Receiver 2 (R-2).

Comparative Element 4 (Comp-4)

Comparative Element 4 (Comp-4) is a combination of Ink set 4 (S-4) and Receiver 2 (R-2).

Comparative Element 5 (Comp-5)

Comparative Element 5 (Comp-5) is a combination of Ink set 2 (S-2) and Receiver 1 (R-1).

Printing and Evaluation of RGD % and RGV %

The test images used consist of cyan, magenta, yellow, red, green and blue single color patches of approximately 3 by 3 centimeters in size with a Dmax density (100% dot coverage). Using an Epson 660 ink jet printer loaded with the three ink sets, the above test images were printed onto recording elements as described above. The test images were allowed to dry for 24 hours at ambient temperature and humidity. Using the BYK-Gardner micro-TRI-glossmeter, gloss level from each patch was measured at 60° specular angle. Multiple measurements were carried out using three individual patches of the same color and the average values were used. Under the same condition, gloss levels from the non-images areas were also measured. RGD % and RGV % values were calculated based on the above data using Equation A and Equation B. The results are shown in Table 1.

Image Quality Evaluation

Using Ink Set 1, Ink Set 2, Ink Set 3 and Ink Set 4, full color photographic images that contains sufficient amount of "non-imaged" or "white" were also printed onto the recording elements as described above. The test images were allowed to dry for 24 hours at ambient temperature and humidity. The test images were then subjected for the Image Quality Evaluation test. Four neutral observers were chosen to view the same images independently under normal office light. Using a ranking scale of 1 to 5, the observers rated the qualities of the images based on gloss differences, especially in the locations between imaged and the non-images area as well as those between colors. The 1 to 5 ranking is based on the following definition: 1: strongly noticeable difference in gloss, 2: somewhat noticeable difference in gloss, 3: tolerable difference in gloss, 4: slightly noticeable difference in gloss, 5: no noticeable difference in gloss. The evaluation results are shown in Table 2.

TABLE 1

| Element | Receiver/Ink Set | 60 degree gloss on color patches | | | | | | | RGD % | RGV % |
|---|---|---|---|---|---|---|---|---|---|---|
| | | Bk | C | M | Y | R | G | B | | |
| Comp-1 | R-2/S-1 | 34 | 62 | 66 | 106 | 73 | 73 | 64 | 53 | 15 |
| Comp-2 | R-2/S-2 | 34 | 65 | 85 | 96 | 78 | 50 | 46 | 53 | 23 |
| Comp-3 | R-2/S-3 | 34 | 82 | 81 | 93 | 84 | 92 | 76 | 61 | 6 |
| Comp-4 | R-2/S-4 | 34 | 62 | 66 | 73 | 70 | 70 | 69 | 51 | 5 |
| Comp-5 | R-1/S-2 | 65 | 63 | 69 | 73 | 48 | 44 | 34 | 25 | 24 |
| I-1 | R-1/S-3 | 65 | 70 | 72 | 66 | 59 | 71 | 65 | 6 | 6 |
| I-2 | R-1/S-4 | 65 | 52 | 64 | 54 | 55 | 63 | 59 | 14 | 7 |

S = ink set
R = ink receiver
Bk: Non-imaged areas, C: Cyan patch, M: Magenta patches, Y: Yellow patch, R: Red patch, G: Green patch and B: Blue patch

TABLE 2

| Element | Receiver/Ink Set | Observer A | Observer B | Observer C | Observer D | Average |
|---|---|---|---|---|---|---|
| Comp-1 | R-2/S-1 | 1 | 1 | 1 | 1 | 1.0 |
| Comp-2 | R-2/S-2 | 1 | 2 | 1 | 1 | 1.2 |
| Comp-3 | R-2/S-3 | 1 | 1 | 2 | 1 | 1.2 |
| Comp-4 | R-2/S-4 | 1 | 2 | 2 | 2 | 1.7 |
| Comp-5 | R-1/S-2 | 2 | 3 | 2 | 3 | 2.5 |
| I-1 | R-1/S-3 | 5 | 5 | 5 | 5 | 5.0 |
| I-2 | R-1/S-4 | 4 | 3 | 4 | 4 | 3.8 |

The above results show that when the gloss level of the porous ink jet recording elements employed in this invention are matched with the gloss levels of the pigment based ink sets, together with matched gloss levels among inks, the printed images have much smaller Relative Gloss Difference (RGD %) values and Relative Gloss Variability (RGV %) values combined as compared to that from the comparative examples. In addition Furthermore, RGD % and RGV % numbers as defined in this invention are consistent with results obtained from image quality evaluation based on human observations.

The present description will be directed in particular to elements forming part of, or cooperating more directly with, apparatus and methods in accordance with the present invention. It is to be understood that elements not specifically shown or described may take various forms well known to those skilled in the art.

What is claimed is:

1. An ink jet ink set and recording element combination comprising:
   A) a porous ink jet recording element having a 60° specular gloss of at least about 5; and
   B) a pigment based ink jet ink set comprising at least two inks;
wherein the RGD value is less than 40% and RGV value among inks is less than 10% when 60° is used as the specular angle; the RGD and RGV values are calculated according to Equations (A) and (B), respectively:

Equation (A)
$$RGD\% = \frac{\sum_{I=1}^{N} |\text{Gloss(Imaged Areas)}_I - \text{Gloss(Non Imaged Areas)}|}{\sum_{I=1}^{N} \text{Gloss(Imaged Areas)}_I}$$

Equation (B)
$$RGV (\%) = \frac{\sum_{I=1}^{N} |(\text{Gloss(Imaged Area)}_I - AG)|}{AG} \bigg/ N$$

Where $$AG = \frac{\sum_{I=1}^{N} \text{Gloss(Imaged Area)}_I}{N}$$

I is a variable which identifies a certain color patch used in the evaluation,

N is the total number of color patches used in the evaluation.

2. The combination of claim 1 wherein the RGD value is less than 30% and RGV value among inks is less than 7% when the specular angle is 60°.

3. The combination of claim 1 wherein the porous ink jet recording element further comprises a support having thereon a porous ink-receiving layer.

4. The combination of claim 3 wherein said porous ink-receiving layer comprises from about 20% to about 95% by weight of inorganic particles and from about 5% to about 80% by weight of a polymeric binder; based on the combined weight of the inorganic particles and the binder.

5. The combination of claim 4 wherein said inorganic particles comprise silica, alumina, titanium dioxide, clay, calcium carbonate, barium sulfate or zinc oxide.

6. The combination of claim 4 wherein said polymeric binder is gelatin, poly(vinyl alcohol), poly(vinyl pyrrolidinone) or poly(vinyl acetate) or copolymers thereof.

7. The combination of claim 3 wherein said porous ink-receiving layer contains organic particles.

8. The combination of claim 3 wherein said porous ink-receiving comprises a polymeric open-pore membrane.

9. The combination of claim 3 wherein said porous ink-receiving layer further contains a crosslinker capable of crosslinking said binder.

10. The combination of claim 3 wherein said support is polyethylene-coated paper.

11. The combination of claim 1 wherein said pigment is a yellow pigment, a cyan pigment, a magenta pigment, a black pigment, a white pigment, a violet pigment, a green pigment, or an orange pigment.

12. The combination of claim 11 wherein said yellow pigment is C.I. Pigment Yellow 155 or C.I. Pigment Yellow 74.

13. The combination of claim 11 wherein said cyan pigment is C.I. Pigment Blue 15:3 or bis(phthalocyanylalumino)tetraphenyldisiloxane.

14. The combination of claim 11 wherein said magenta pigment is C.I. Pigment Red 122.

15. The combination of claim 11 wherein said black pigment is C.I. Pigment Black 7.

16. The combination of claim 1 wherein the inks in the ink set comprise non-film forming particles.

17. The combination of claim 16 wherein the non-film forming particles are between 0.03 and 0.5 micron.

18. The combination of claim 16 where the non-film forming particles are inorganic particles.

19. The combination of claim 18 wherein the inorganic particles are silica, alumina, titinium dioxide, zircona and clay, calcium carbonate, barium sulfate or zinc oxide.

20. The combination of claim 16 wherein the non-film forming particles are organic polymeric particles.

21. The combination of claim 20 wherein the organic polymeric particle is a polyurethane, a polyacrylic, or a polyester with a Tg of greater than 60° C.

22. The combination of claim 1 wherein the ink in the ink set further comprises a film forming polymer resin.

23. The combination of claim 22 wherein the film forming polymer resin is water dispersible.

24. The combination of claim 22 wherein the film forming polymer resin is a polyester, a polyurethane or a polyacrylic.

25. The combination of claim 24 wherein the polyester is a sulfonated polyester ionomer.

26. The ink set of claim 1 imagewise disposed on the receiver of claim 1.

* * * * *